(12) United States Patent
    Fokoue-Nkoutche et al.

(10) Patent No.: US 10,387,496 B2
(45) Date of Patent: Aug. 20, 2019

(54) STORING GRAPH DATA IN A RELATIONAL DATABASE

(71) Applicant: INTERNATIONAL BUSINESS MACHINES CORPORATION, Armonk, NY (US)

(72) Inventors: Achille B. Fokoue-Nkoutche, White Plains, NY (US); Gang Hu, Beijing (CN); Anastasios Kementsietsidis, Mountain View, CA (US); Kavitha Srinivas, Rye, NY (US); Wen B. Sun, Beijing (CN); Guo Tong Xie, Xi Er Qi (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 360 days.

(21) Appl. No.: 14/718,147

(22) Filed: May 21, 2015

(65) Prior Publication Data

US 2016/0342708 A1    Nov. 24, 2016

(51) Int. Cl.
    *G06F 16/22*        (2019.01)
    *G06F 16/901*       (2019.01)
    (Continued)

(52) U.S. Cl.
    CPC ...... *G06F 16/9024* (2019.01); *G06F 16/2255* (2019.01); *G06F 16/24522* (2019.01); *G06F 16/284* (2019.01); *G06F 16/9014* (2019.01)

(58) Field of Classification Search
    CPC ......... G06F 17/30477; G06F 17/30932; G06F 17/30716; G06F 17/30466; G06F 17/30958; G06F 17/30584; G06F 17/30949; G06F 17/30595; G06F 17/3033; G06F 17/3043; G06F 17/30427; G06F 17/30404;
    (Continued)

(56) References Cited

U.S. PATENT DOCUMENTS 8,332,624 B2 * 12/2012 Sovio ............... G06N 5/02
                                                    713/150
8,443,005 B1 *  5/2013 Goldman .......... G06Q 50/01
                                                    707/798
(Continued)

OTHER PUBLICATIONS

Graph Databases by Ian Robinson, Emil Eifrem, Jim Webber; NOSQL Overview—Graph Databases; Release Date: Jun. 2013; ISBN: 9781449356255; All pages.*
(Continued)

*Primary Examiner* — Jay A Morrison
*Assistant Examiner* — Antonio J Caiado
(74) *Attorney, Agent, or Firm* — Cantor Colburn LLP; Rahan Uddin

(57) ABSTRACT

Embodiments include methods, systems and computer program products for storing graph data for a directed graph in a relational database. Aspects include creating a plurality of relational tables for the graph data, using a processor on a computer, the plurality of relational tables including adjacency tables and attribute tables. Each row of the attribute tables is dedicated to a subject of the graph data in the dataset and stores a JavaScript Object Notation (JSON) object corresponding to the subject. Each row of the adjacency tables includes a hashtable containing properties and values of the subject for that row.

6 Claims, 9 Drawing Sheets

(51) Int. Cl.
*G06F 16/28* (2019.01)
*G06F 16/2452* (2019.01)

(58) Field of Classification Search
CPC ......... G06F 17/304777; G06F 17/3053; G06F 16/9024; G06F 16/284; G06F 16/9014; G06F 16/24522
USPC ..... 707/760, 747, 14.34; 382/284, 217, 165, 382/103; 386/280, 278, 285; 358/1.9; 715/738; 706/50
See application file for complete search history.

(56) References Cited

U.S. PATENT DOCUMENTS

| | | | | |
|---|---|---|---|---|
| 8,572,091 | B1* | 10/2013 | Sivasubramanian | G06F 16/278 707/747 |
| 9,225,730 | B1* | 12/2015 | Brezinski | G06F 21/00 |
| 9,378,239 | B1* | 6/2016 | Long | G06F 17/30958 |
| 9,378,241 | B1* | 6/2016 | Shankar | G06F 17/30395 |
| 9,378,303 | B1* | 6/2016 | Shankar | G06F 17/30958 |
| 9,418,176 | B2* | 8/2016 | Baranov | G06F 17/30958 |
| 9,734,607 | B2* | 8/2017 | Macko | G06T 11/206 |
| 2007/0208693 | A1* | 9/2007 | Chang | G06F 16/20 |
| 2009/0216867 | A1* | 8/2009 | Pusateri | H04L 41/022 709/222 |
| 2010/0161651 | A1* | 6/2010 | Cras | G06F 17/30466 707/769 |
| 2011/0099502 | A1* | 4/2011 | Kim | G06F 16/955 715/771 |
| 2011/0173189 | A1* | 7/2011 | Singh | G06F 17/30958 707/722 |
| 2013/0097320 | A1* | 4/2013 | Ritter | G06Q 10/06 709/226 |
| 2013/0103725 | A1* | 4/2013 | Wee | G06F 16/221 707/812 |
| 2013/0124574 | A1* | 5/2013 | Brettin | G06F 17/30958 707/798 |
| 2013/0166600 | A1* | 6/2013 | Snyder, II | G06F 16/9024 707/797 |
| 2013/0218899 | A1* | 8/2013 | Raghavan | G06F 17/30958 707/741 |
| 2014/0019490 | A1* | 1/2014 | Roy | G06F 17/30073 707/798 |
| 2014/0244657 | A1* | 8/2014 | Mizell | G06F 17/30321 707/743 |
| 2015/0026189 | A1* | 1/2015 | Li | G06F 16/2228 707/741 |
| 2015/0052175 | A1 | 2/2015 | Bornea et al. | |
| 2015/0095182 | A1* | 4/2015 | Zhou | H04N 21/4668 705/26.7 |
| 2015/0127677 | A1* | 5/2015 | Wang | G06F 17/30424 707/769 |
| 2015/0310644 | A1* | 10/2015 | Zhou | G06F 17/16 345/440 |
| 2015/0370919 | A1* | 12/2015 | Bornhoevd | G06F 17/30958 707/798 |
| 2016/0063100 | A1* | 3/2016 | Anton | G06F 17/30318 707/739 |
| 2016/0063191 | A1* | 3/2016 | Vesto | G16H 50/70 705/2 |
| 2016/0071233 | A1* | 3/2016 | Macko | G06T 11/206 345/440 |
| 2016/0103899 | A1* | 4/2016 | Zheng | G06F 16/254 707/602 |
| 2016/0179883 | A1* | 6/2016 | Chen | G06F 16/24528 707/714 |
| 2016/0203422 | A1* | 7/2016 | Demarchi | G06Q 10/025 705/6 |
| 2016/0246826 | A1* | 8/2016 | Lee | G06F 17/30498 |
| 2016/0275201 | A1* | 9/2016 | Li | G06F 17/30958 |

OTHER PUBLICATIONS

Craig Chasseur et al.; Enabling JSON Document Stores in Relational Systems; University of Wisconsin; WebDB; 2013; all pages.*
Karamjit Kaur et al. Modeling and Querying Data in NoSQL Databases; IEEE International Conference on Big Data; 2013; all pages.*
Armstrong et al., "LinkBench: a Database Benchmark Based on the Facebook Social Graph", SIGMOD'13, Jun. 22-27, 2013, Copyright 2013 ACM; 12 pgs.
Bornea et al., "Building an efficient RDF store over a relational database", SIGMOD'13, Jun. 22-27, 2013; Copyright 2013 ACM, 12 pgs.
GITHUB—TINKERPOP "Blueprints" available at https://github.com/tinkerpop/blueprints/wiki; retrieved on May 20, 2015; 3 pgs.
GITHUB—TINKERPOP "Gremlin" available: https://github.com/tinkerpop/gremlin/wiki; retrieved on May 20, 2015; 3 pgs.
GITHUB—TINKERPOP "Pipes" available at https://github.com/tinkerpop/pipes/wiki; retrieved on May 20, 2015; 2 pgs.
Morsey et al., "DBpedia SPARQL Benchmark—Performance Assessment with Real Queries on Real Data", The Semantic Web; ISWC 2011, Springer 2011, pp. 454-469.
Sakr et al., "G-SPARQL: A Hybrid Engine for Querying Large Attributed Graphs", CIKM '12 Proceedings of the 21st ACM International Conference on Information and Knowledge Management; pp. 335-344.
Sun et al., "SQLGraph: An Efficient Relational-Based Property Graph Store", SIGMOD'15, May 31-Jun. 4, 2015; ACM; 15 pgs.
List of IBM Patents or Patent Applications Treated as Related—Date Filed: Jul. 20, 2015; 2 pages.
U.S. Appl. No. 14/742,735, filed Jun. 18, 2015; Entitled: "Storing Graph Data in a Relational Database".

* cited by examiner

| VID* | SPILL | EID₁ | LBL₁ | VAL₁ | ... | EIDₓ | LBLₓ | VALₓ |
|---|---|---|---|---|---|---|---|---|
| 1 | 0 | null | knows | 101 | | 9 | created | 3 |
| 4 | 0 | 10 | like | 2 | | 11 | created | 3 |

Outgoing Primary Adjacency (OPA)

FIG. 3A

| VALID* | EID | VAL |
|---|---|---|
| 101 | 7 | 2 |
| 101 | 8 | 4 |

Outgoing Secondary Adjacency (OSA)

FIG. 3B

| VID* | SPILL | EID₂ | LBL₂ | VAL₂ | ... | EID₃ | LBL₃ | VAL₃ |
|---|---|---|---|---|---|---|---|---|
| 2 | 0 | 7 | knows | 1 | | 10 | like | 4 |
| 3 | 0 | null | null | null | | null | created | 102 |
| 4 | 0 | 8 | knows | 1 | | null | null | null |

Incoming Primary Adjacency (IPA)

FIG. 3C

| VALID* | EID | VAL |
|---|---|---|
| 102 | 9 | 1 |
| 102 | 11 | 4 |

Incoming Secondary Adjacency (ISA)

FIG. 3D

Vertex Attributes (VA)

| VID | ATTR (JSON object) |
|---|---|
| 1 | {"name"="marko", "age"=29} |
| 2 | {"name"="vadas", "age"=27} |
| 3 | {"name"="lop", "lang"="java"} |
| 4 | {"name"="josh", "age"=32} |

FIG. 3E

Edge Attributes (EA)

| EID | INV | OUTV | LBL | ATTR (JSON object) |
|---|---|---|---|---|
| 7 | 1 | 2 | knows | {"weight"=0.5} |
| 8 | 1 | 4 | knows | {"weight"=1.0} |
| 9 | 1 | 3 | created | {"weight"=0.4} |

FIG. 3F

STORING GRAPH DATA IN A RELATIONAL DATABASE

BACKGROUND

The present disclosure relates to storing graph data in a relational database, and more specifically, to methods, systems and computer program products for storing graph data in a relational database by creating attribute tables that store JavaScript Object Notation (JSON) objects.

Recently, there has been an increase of interest in graph data management, fueled in part by the growth of graph data on the web, as well as diverse applications of graphs in social network analytics, scientific applications, web search, machine learning, and data mining. In general, relational database storage systems have not been used to store graph data due to concerns about the efficiency of storing sparse graph adjacency data in relational storage. However, relational systems offer significant advantages over noSQL or native systems because they are fully ACID (Atomicity, Consistency, Isolation, and Durability) compliant, and have industrial strength support for concurrency, locking, security and query optimization. For storing graph data that require these attributes, relational databases may provide an attractive mechanism for graph data management.

SUMMARY

In accordance with an embodiment, a method for storing graph data for a directed graph in a relational database is provided. The method includes creating a plurality of relational tables for the graph data, using a processor on a computer, the plurality of relational tables including adjacency tables and attribute tables. Each row of the attribute tables is dedicated to a subject of the graph data in the dataset and stores a JavaScript Object Notation (JSON) object corresponding to the subject. Each row of the adjacency tables includes a hashtable containing properties and values of the subject for that row.

In accordance with another embodiment, a processing system for storing graph data for a directed graph in a relational database includes a processor. The processor is configured to perform a method that includes creating a plurality of relational tables for the graph data, using a processor on a computer, the plurality of relational tables including adjacency tables and attribute tables. Each row of the attribute tables is dedicated to a subject of the graph data in the dataset and stores a JavaScript Object Notation (JSON) object corresponding to the subject. Each row of the adjacency tables includes a hashtable containing properties and values of the subject for that row.

In accordance with a further embodiment, a computer program product for storing graph data for a directed graph in a relational database includes a non-transitory storage medium readable by a processing circuit and storing instructions for execution by the processing circuit for performing a method. The method includes creating a plurality of relational tables for the graph data, using a processor on a computer, the plurality of relational tables including adjacency tables and attribute tables. Each row of the attribute tables is dedicated to a subject of the graph data in the dataset and stores a JavaScript Object Notation (JSON) object corresponding to the subject. Each row of the adjacency tables includes a hashtable containing properties and values of the subject for that row.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 3A, 3B, 3C and 3D are block diagrams of adjacency tables of a relational database for storing graph data in accordance with an exemplary embodiment;

FIGS. 3E and 3F are block diagrams of attribute tables of a relational database for storing graph data in accordance with an exemplary embodiment;

DETAILED DESCRIPTION

In accordance with exemplary embodiments of the disclosure, methods, systems and computer program products for storing graph data in a relational database are provided. In exemplary embodiments, the relational database includes adjacency tables and an attribute tables that are used to store the graph data. The attribute tables are used to store vertex attributes and edge attributes and store a JavaScript Object Notation (JSON) object corresponding to the vertexes and edges. The adjacency tables store hashtables containing properties and values of edges in the graph data. Exemplary embodiments also include methods for translating a procedural language query, such as a Gremlin query, into a declarative language query, such as SQL query.

Figure 1:
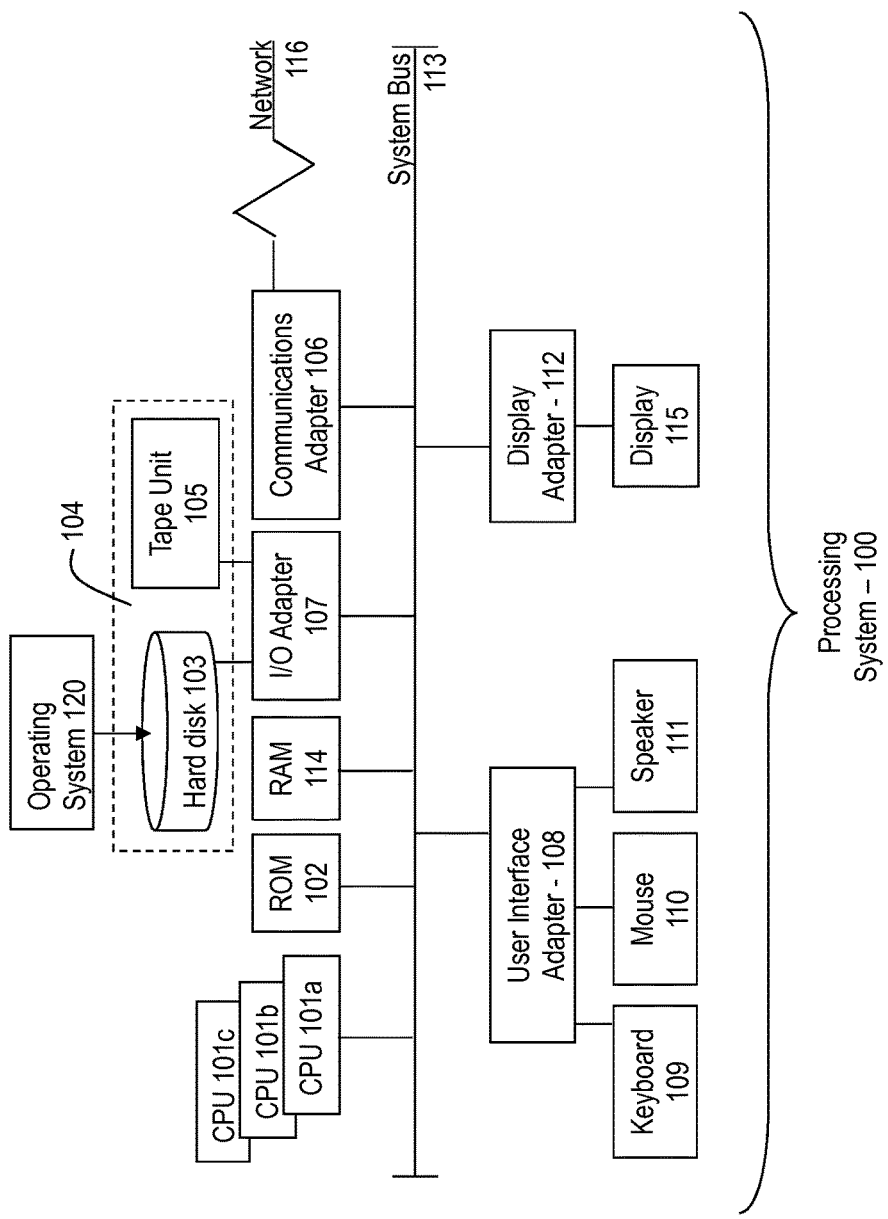
FIG. 1 is a block diagram of one example of a processing system for practice of the teachings herein.

Referring now to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
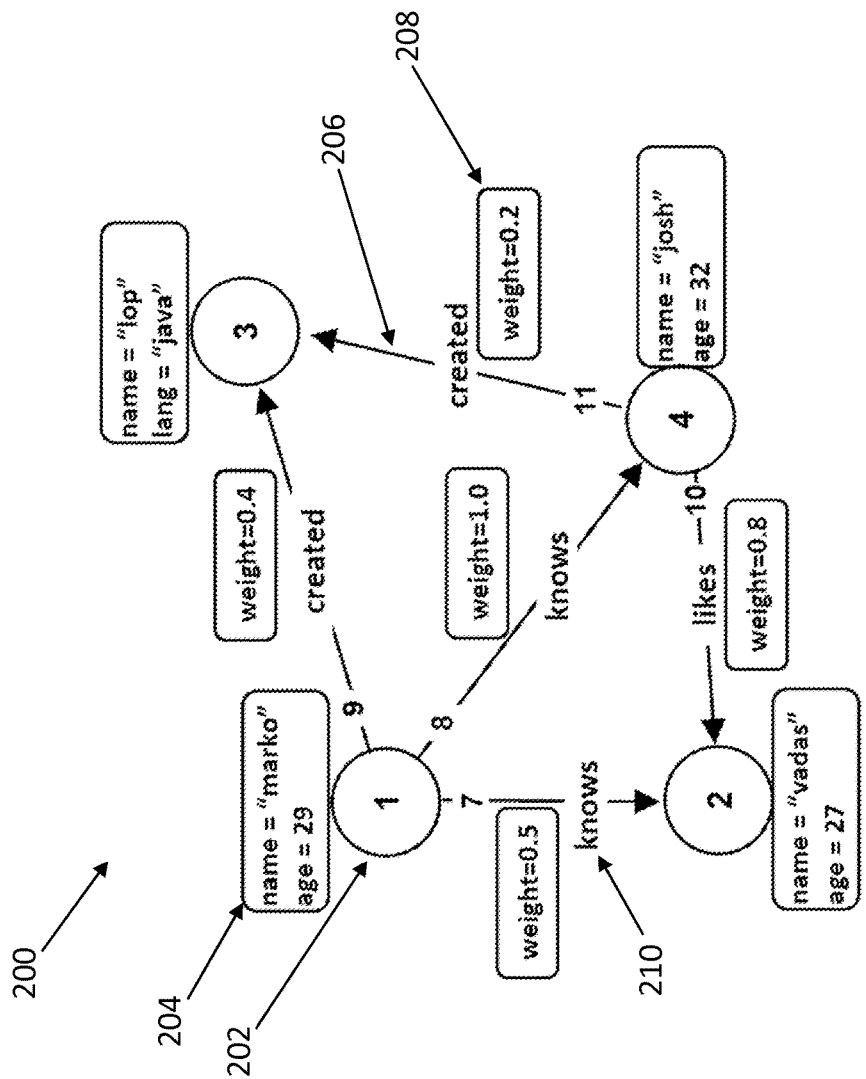
FIG. 2 is an illustration of a directed graph in accordance with an exemplary embodiment.

One common data model for representing directed graph data is RDF and another model such data model is a property graph data model. The property graph data model is a directed labeled graph like RDF, but with attributes that can be associated with each vertex or edge in a graph, FIG. 2 illustrates an example of a property graph. The attributes of a vertex such as name and language are encapsulated in a vertex object as key-value pairs. In RDF, they would be modeled as extra edges from the vertex to literals with the edge labels of name and language, respectively. Similarly, the attributes of an edge are associated with an edge object, with attributes such as weight and its value represented as key-value pairs.

Property graph data models differ from RDF models in at least two ways, property graph data model have an object model for representing graphs and an accompanying query language called Gremlin which is different from SPARQL. While SPARQL, the query language for RDF is declarative, Gremlin is a procedural graph traversal language, allowing the programmer to express queries as a set of steps or pipes For example, a typical query might start at all vertices filtered by some vertex attribute p, traverse outward from that vertex along edges with labels a, and so on. Each step produces an iterator over some elements (e.g., edges or vertices in the graph). In Gremlin, it is possible to have arbitrary code in some programming language such as Java act as a pipe to produce side effects.

Referring now to FIG. 2, a directed graph 200 in accordance with an exemplary embodiment is shown. As illustrated, the directed graph 200 includes a plurality of vertexes 202 that are connected by edges 206 and each vertex 202 and edge 206 are assigned identification numbers. In addition, each vertex 202 has an associated attribute 204 and each edge 206 has both an associated attribute 208 and a label 210. Although the attribute 208 for each edge 206 shown is for a weight value, those of ordinary skill in the art will appreciate that the attributes 208 of edges 206 may include a wide variety of information regarding the edge 206. Likewise, the attributes 204 of the vertexes 202 may include a wide variety of information regarding the vertex 202.

Referring now to FIGS. 3A and 3B, block diagrams of outgoing adjacency tables of a relational database for storing graph data, such as that shown in the directed graph of FIG. 2, in accordance with exemplary embodiments are shown. FIG. 3A illustrates an adjacency table configure to store the outgoing primary adjacency for each vertex of the directed graph. As illustrated, the adjacency table includes a row that corresponds to each vertex that has an outgoing edge. Each row of the outgoing primary adjacency table includes as vertex identification 302, edge identification 304, an edge label 306 and vertex destination identification 308 for each edge that originates at the vertex. In cases where multiple edges originate from a single vertex and have the same label, the vertex destination identification 308 may be used to provide an index value 310 for an outgoing secondary adjacency table, such as the one shown in FIG. 3B. The outgoing secondary adjacency table includes an index value 310, edge identification 304 and vertex destination identification 308 and is used to store data for multiple edges that originate at the same vertex and that have the same label.

Referring now to FIGS. 3C and 3D, block diagrams of incoming adjacency tables of a relational database for storing graph data, such as that shown in the directed graph of FIG. 2, in accordance with exemplary embodiments are shown. FIG. 3C illustrates an adjacency table configure to store the incoming primary adjacency for each vertex of the directed graph. As illustrated, the adjacency table includes a row that corresponds to each vertex that has an incoming edge. Each row of the incoming primary adjacency table includes as vertex identification 302, edge identification 304, an edge label 306 and vertex origin identification 312 for each edge that terminates at the vertex. In cases where multiple edges terminate at single vertex and have the same label, the vertex destination identification 308 may be used to provide an index value 310 for an incoming secondary adjacency table, such as the one shown in FIG. 3D. The incoming secondary adjacency table includes an index value 310, edge identification 304 and vertex origin identification 312 and is used to store data for multiple edges that terminate at the same vertex and that have the same label.

Referring now to FIG. 3E, a block diagram of vertex attribute table of a relational database for storing graph data, such as that shown in the directed graph of FIG. 2, in accordance with exemplary embodiments is shown. As illustrated, the vertex attribute table includes vertex identification 302 and a vertex attribute 314. In exemplary embodiments, the vertex attribute 314 is a JavaScript Object Notation (JSON) object that stores both a property of the vertex and a value associated with the property. In exemplary embodiments, the vertex attribute 314 can be used to store multiple properties and their associated values. In exemplary embodiments, the use of a separate vertex attribute table avoids redundant storage of the attributes, in case vertices span multiple rows.

Referring now to FIG. 3F, a block diagram of edge attribute table of a relational database for storing graph data, such as that shown in the directed graph of FIG. 2, in accordance with exemplary embodiments is shown. As illustrated, the edge attribute table includes edge identification 304, edge source identification 316, edge destination identification 318, an edge label 306 and an edge attribute 320. In exemplary embodiments, the edge attribute 320 is a JavaScript Object Notation (JSON) object that stores both a property of the edge and a value associated with the property. In exemplary embodiments, the edge attribute 320 can be used to store multiple properties and their associated values. In exemplary embodiments, the use of a separate edge attribute table avoids redundant storage of the attributes, in case edges span multiple rows. As illustrated, the edge attribute table not only stores the edge attributes in JSON column, but also keeps a copy of the adjacency information of each edge. In exemplary embodiments, redundantly storing this data in the edge attribute table provides benefits on certain types of graph queries and has a minimal impact on the storage costs due to the compression schemes typically used relational databases.

In exemplary embodiments, when creating the adjacency tables, if there are collisions of hashing, the SPILL column will be set for the vertex to indicate multiple rows are required to represent the outgoing adjacency information of the vertex. In addition, if the vertex has multiple incoming or outgoing edges with the same label, the edge identification and connected vertices are stored in the secondary adjacency tables, as shown in the FIG. 3B for the edge between 1 and its edges to 2 and 4.

In exemplary embodiments, for vertex attribute and edge attribute tables, the vertex identification 302 and edge identification 304 are respectively used as the primary keys. For the other tables, indexes are used over the vertex identification 302 and index value 310 columns, to support efficient table joins. In exemplary embodiments, depending on the workloads of the property graph, more relational and JSON indexes can be built to accelerate specific query types or graph operations, which is similar to the functionality provided by most property graph stores.

Figure 4:
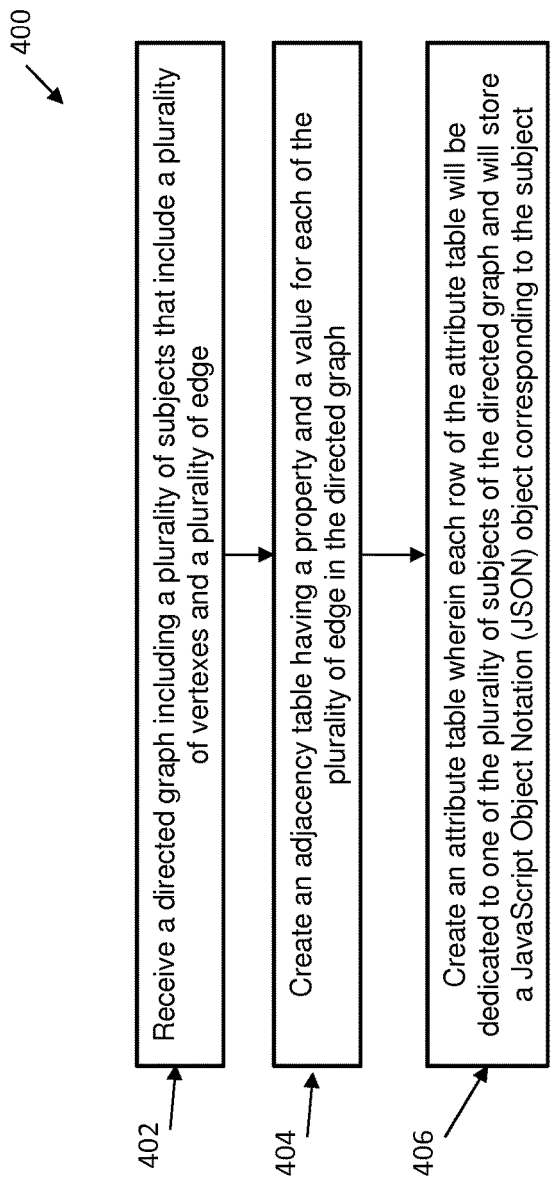
FIG. 4 is a flow diagram of a method storing graph data in a relational database in accordance with an exemplary embodiment.

Referring now to FIG. 4, a flow diagram of a method 400 for storing graph data in a relational database in accordance with an exemplary embodiment is shown. As shown at block 402, the method 400 includes receiving a directed graph including a plurality of subjects that include a plurality of vertexes and a plurality of edge. Next, as shown at block 404, the method 400 includes creating an adjacency table having a property and a value for each of the plurality of edges in the directed graph. The method 400 also includes creating an attribute table wherein each row of the attribute table is dedicated to one of the plurality of subjects of the directed graph and stores a JavaScript Object Notation (JSON) object corresponding to the subject, as shown at block 406.

Figure 5:
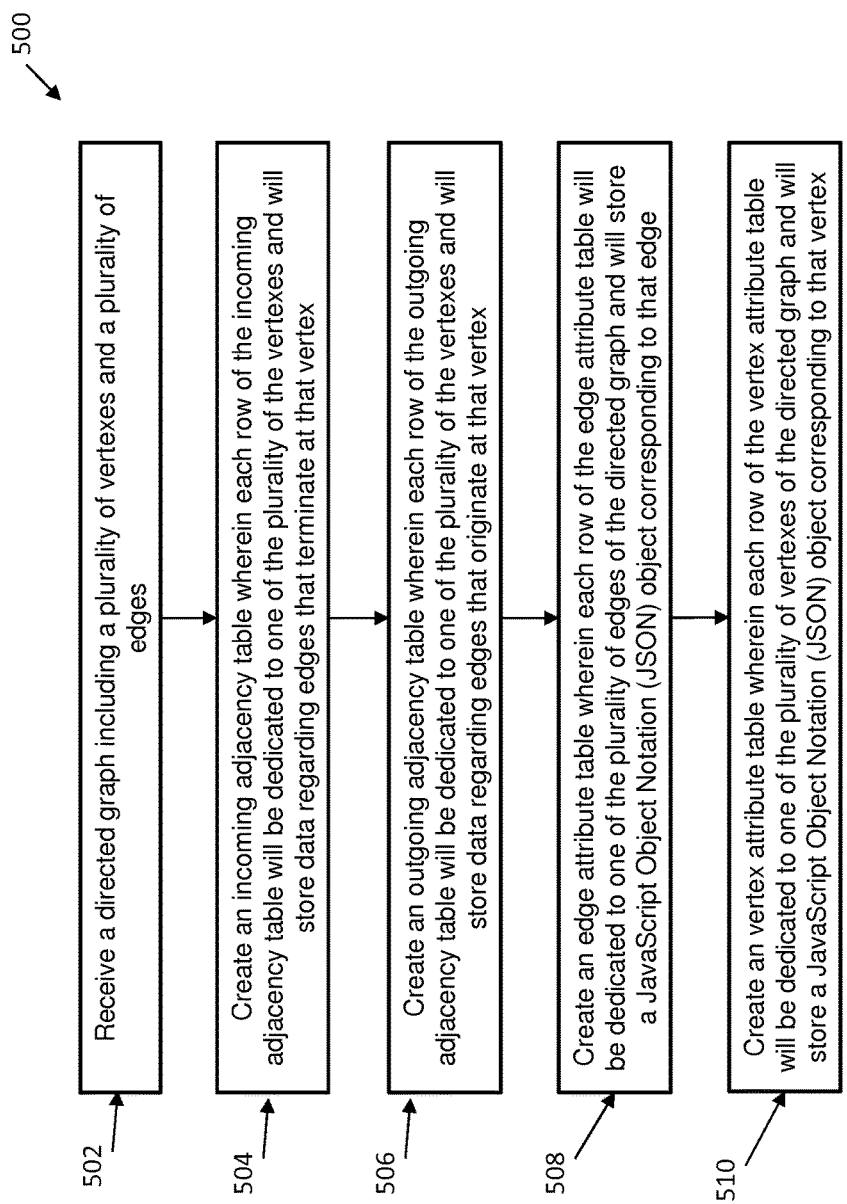
FIG. 5 is a flow diagram of another method for storing graph data in a relational database in accordance with an exemplary embodiment.

Referring now to FIG. 5, a flow diagram of another method 500 for storing graph data in a relational database in accordance with an exemplary embodiment is shown. As shown at block 502, the method 500 includes receiving a directed graph including a plurality of vertexes and a plurality of edges. Next, as shown at block 504, the method 500 includes creating an incoming adjacency table wherein each row of the incoming adjacency table is dedicated to one of the plurality of the vertexes and stores data regarding edges that terminate at that vertex. The method 500 also includes creating an outgoing adjacency table wherein each row of the outgoing adjacency table is dedicated to one of the plurality of the vertexes and stores data regarding edges that originate at that vertex, as shown at block 506. Next, as shown at block 508, the method 500 includes creating an edge attribute table wherein each row of the attribute table is dedicated to one of the plurality of edges of the directed graph and stores a JavaScript Object Notation (JSON) object corresponding to that edge. The method 500 also includes creating a vertex attribute table wherein each row of the attribute table is dedicated to one of the plurality of vertexes of the directed graph and stores a JavaScript Object Notation (JSON) object corresponding to that vertex, as shown at block 510.

As discussed above, Gremlin is the de facto standard property graph query traversal language for property graph databases. Gremlin is a procedural query language, which makes it difficult to compile it into a declarative query language like SQL. Nevertheless, Gremlin can be used to express graph traversal or graph update operations alone, and these can be mapped to declarative languages.

A Gremlin query consists of a sequence of steps, called pipes. The evaluation of a pipe takes as input an iterator over some objects and yields a new iterator. Gremlin includes various categories of operations that include:

| Gremlin Operation Types | Description |
|---|---|
| Transform | Take an object and emit a transformation of it. Examples: both( ), inE( ), outV( ), path( ) |
| Filter | Decide whether to allow an object to pass. Examples: has( ), except( ), simplePath( ) |
| Side Effect | Pass the object, but with some kind of side effect while passing it. Examples: aggregate( ), groupBy( ), as( ) |
| Branch | Decide which step to take. Examples: split/merge, ifThenElse, loop |

The following is a standard evaluation of a Gremlin query that counts the number of distinct vertices with an edge to or from at least one vertex that has 'w' as the value of its 'tag' attribute:

V.filter{it.tag=='w'}.both.dedup( ).count( )

The first pipe of the query V returns an iterator $it_1$ over all the vertices in the graph g. The next pipe filter{it.tag=='w'} takes as input the iterator $it_1$ over all vertices in the graph g, and yields a new iterator $it_2$ that retains only vertices with 'w' as the value of their 'tag' attribute. The both pipe then takes as input the iterator $it_2$ and returns an iterator $it_3$ containing, for each vertex v in $it_2$, all vertices u such that the edge (v, u) or (u, v) is in the graph g (note that $it_3$ may contain duplicated values). The dedup( ) produces an iterator $it_4$ over unique values appearing in the iterator $it_3$. Finally, the last pipe count( ) returns an iterator with a single value corresponding to the number of elements in the previous iterator $it_4$.

The standard implementation of the Gremlin query language operates over any graph database that supports the basic set of primitive CRUD (Create Read Update Delete) graph operations defined by the Blueprints APIs (e.g., operations to iterate over all the vertices and edges in a graph or over all incoming or outgoing edges of a given vertex). One method to support Gremlin queries is to implement the Blueprints APIs over the graph database, as most of the existing property graph stores do. However, this approach results in a huge number of generated SQL queries for a single Gremlin query, and multiple data accesses between the client code and the graph database server, which leads to significant performance issues. For instance, for the example query in the previous section, for each vertex v returned by the pipe filter{it.tag=='w'}, the Blueprints' method getVertices(Direction.BOTH) will be invoked on v to get all its adjacent vertices in both directions, which will result in the evaluation, on the graph database server, of a SQL query retrieving all the vertices that have an edge to or from v.

In exemplary embodiments, a query processing method is provided that converts a Gremlin query into a single SQL query. By converting a Gremlin query into a single SQL query the chatty protocol between the client and the database server can be eliminated and the query optimization research and development work that have gone into mature relational database management systems can be leveraged. In other words, by specifying the intent of the graph traversal in one declarative query, the database engine's query optimizer can be leveraged to perform the query in an efficient manner.

Figure 6:
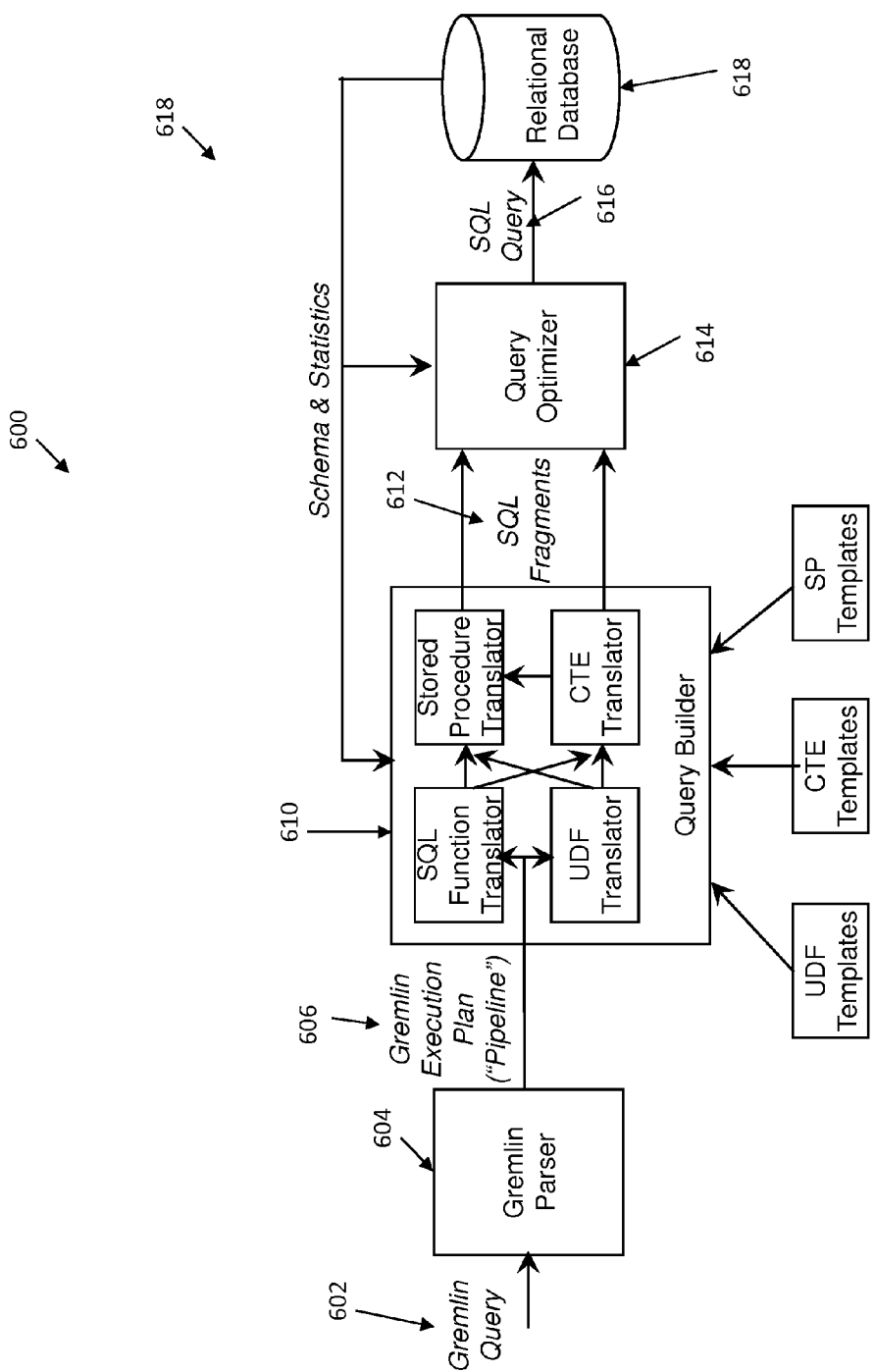
FIG. 6 is a block diagram of a query processing framework in accordance with an exemplary embodiment.

Referring now to FIG. 6, a block diagram of a query processing framework 600 in accordance with an exemplary embodiment is shown. As illustrated, an input Gremlin query 602 is received and parsed into an execution pipeline 606 by a Gremlin parse 604. The execution pipeline 606 includes a set of ordered Gremlin operations (i.e., pipes). The pipes are then sent to the query builder 610, where a set of pre-defined templates, which are of different types including SQL functions, user defined functions (UDFs), common table expression (CTE) fragments and stored procedures (SPs), are used to translate the pipes into SQL fragments 612. Based on the order of the input pipes, the SQL fragments 612 are composed together and optimized by the query optimizer 614 to create a SQL query 616 that is sent to the relational database 618 for execution.

In the standard implementation of Gremlin, the input or output of a pipe is an iterator over some elements. In the SQL based implementation, the input or output of a pipe is a table (a materialized table or a named Common Table Expression (CTE)) with a mandatory column named val that contains the input or output objects, and an optional column named path that represents the traversal path for each element in the val column (this path information is required by some pipes such as simplePath or path).

The translation of a gremlin pipe e, denoted [e], can be defined as a function that maps the input table $t_{in}$ of the pipe to a tuple of (sp, spi, cte, $t_{out}$), where: $t_{out}$ (also denoted [e].out) is the result table of the pipe; sp (also denoted [e].sp) is the list of stored procedure definitions used in the translation of e; spi (also denoted [e].spi) is the list of stored procedure invocations for a subset of stored procedures in sp; and cte (also denoted [e].cte) is the list of pairs (cteName, cteDef) consisting of the name and the definition of Common Table Expressions (CTEs) used in the translation of e. If the translation is done through CTEs, then $t_{out}$ is the name of one of the CTEs in cte. Otherwise, it is the name of a temporary table created and populated by the invocation of the last element of spi.

As mentioned above, Gremlin includes various categories of operations that include transform pipes, filter pipes, side effect pipes and branch pipes. In exemplary embodiments, a different query template is used for the conversion of each of the different type of pipes.

Transform pipes control the traversal between the vertices in a graph. In exemplary embodiments, if the transform operation appears as the only graph traversal step in the query (i.e., for a simple look-up query), the most efficient translation, in general, uses the edge table (EA). Otherwise, the translated CTE template joins with the hash adjacency tables. For example, the out pipe, which outputs the set of adjacent vertices of each input vertex, is translated by the following template parametrized by the input table $t_{in}$ if the pipe is part of a multi-step traversal query:

```
[out](t_in)=(0, 0, cte, t_1)
cte = {
(t0,SELECT t.val FROM t_in v,OPA p,
    TABLES(VALUES(p.val_0), ... ,(p.val_n))AS t(val)
    WHERE v.val=p.entry AND t.val is not null),
(t_1,SELECT COALESCE(s.val, p.val) AS val
    FROM t_0 p LEFT OUTER JOIN OSA s on p.val=s.id)}
```

Otherwise, if the out pipe is the only graph traversal step in the query, the preferred translation uses the edge table (EA) as follows:

```
[out](t_in)=(0, 0, cte, t_0)
cte = {(t_0,SELECT p.outv AS val FROM t_in v, EA p
    WHERE v.val=p.inv )}
```

A more complex transform pipe is the path pipe. It requires the system to record the paths of the traversal. Hence, if the path pipe is enabled, the additional path column has to be added to the CTE templates. The translation of a pipe e that keeps track of the path of each object is denoted $[e]_p$. $[e]_p$ is similar to [e] except that it assumes that the input table $t_{in}$ has a column called path and it produces an output table $t_{out}$ with a column named path for storing the updated path information. For example, when path information tracking is enable, the out pipe is translated by the following template parametrized by the input table $t_{in}$ (assuming the pipe is part of a multiple step traversal query):

```
[out]_p(t_in)=(0, 0, cte, t_1)
cte = {
(t_0,SELECT t.val AS val, (v.path || v.val) AS path
    FROM t_in v, OPA p,
    TABLES(VALUES(p.val_0), ... ,(p.val_n))AS t(val)
    WHERE v.val=p.entry AND t.val is not null),
(t_1,SELECT COALESCE(s.val, p.val) AS val, p.path
    FROM t_0 p LEFT OUTER JOIN OSA s on p.val=s.id)}
```

Filter pipes typically filter out unrelated vertices or edges by attribute lookup. Hence, the corresponding CTE templates can simply apply equivalent SQL conditions on JSON attribute table lookup. For the filter conditions not supported by default SQL functions, such as the simplePath( ) pipes, UDFs are defined to enable the filter condition translation.

Side effect pipes do not change the input graph elements, but generate additional information based on the input. In exemplary embodiments, side effects pipes can be ignored, or treated as identity functions (i.e., their output is identical to their input).

Branch pipes control the execution flow of other pipes. For split/merge pipes and ifElseThen( ) pipes, CTEs can be used to represent all the possible branches, and use condition filters to get the desired branch. For example, for a given input table $t_{in}$ and an ifThenElse pipe e=ifElseThen $\{e_{test}\}\{e_{then}\}\{e_{else}\}$, the test expression $e_{test}$ is translated as a transform expression that yields a Boolean value, and provenance information is tracked in the path column. Let test be the result of the translation: test=$[e_{test}]_p(t_{in})$. Using the output table of test (i.e., test.out), we then define the CTE thencte$_{in}$ (resp.elsecte$_{in}$) corresponding to the input table for the evaluation of $e_{then}$ (resp. $e_{else}$):

```
thencte_in=(then_in,SELECT path[0] AS val FROM test.out
    WHERE val=true)
elsecte_in=(else_in,SELECT path[0] AS val FROM test.out
    WHERE val=false)
```

The translation of the ifThenElse expression e for the input table $t_{in}$ can be defined by collecting all the stored procedure definitions and invocations, and CTEs produced by the translations of 1) the test condition (test=$[e_{test}]_p(t_{in})$), 2) the then part (then=[ethen](thenin)), and 3) the else part (else=[eelse](elsein)):

```
[e](t_in) = (sp, spi, cte, t_out)
    sp = test.sp ∪ then.sp ∪ else.sp
```

```
           spi = test.spi ∪ then.spi ∪ else.spi
           cte = test.cte ∪ {thencte_in, elsecte_in}
             ∪ then.cte ∪ else.cte ∪ {(t_out,
               SELECT * FROM then, out
               UNION ALL SELECT * FROM else, out)}
```

The result table $t_{out}$ is defined as the union of results from the then part and else part.

For loop pipes, the depth of the loop is first evaluated. For fixed-depth loops, the loop will be directly expanded and translated it into CTEs. For non-fixed-depth loops, the loop pipe is translated into a recursive SQL or a stored procedure call, depending on the engine's efficiency in handling recursive SQL.

The following is an example of using CTEs to translate the above sample Gremlin query:

|  | g.V.filter(it.tag= ='w').both.dedup( ).count( ) |
|---|---|
| Start + AttributeFilter | WITH<br>TEMP_1 AS (—JSON attribute lookup<br>  SELECT VID AS VAL<br>  FROM VA<br>  WHERE JSON_VAL( ATTR, 'tag') = 'w' ), |
| BothPipe | TEMP_2_0 AS (—Outgoing adjacent vertexes in OPA<br>  SELECT T.VAL<br>  FROM TEMP_1 V, OPA P,<br>    TABLE( VALUES(P.VAL0), (P.VAL1),..., (P.VALN) ) AS T(VAL)<br>  WHERE V.VAL = P.VID AND T.VAL IS NOT NULL ),<br>TEMP_2_1 AS (—Outgoing adjacent vertexes in OSA<br>  SELECT COALESCE( S.VAL, P.VAL ) AS VAL<br>  FROM TEMP_2_0 P<br>  LEFT OUTER JOIN OSA S<br>  ON P.VAL = S.VALID ),<br>TEMP_2_2 AS (—Incoming adjacent vertexes in IPA<br>  SELECT T.VAL<br>  FROM TEMP_1 V, IPA P,<br>    TABLE( VALUES(P.VAL0), (P.VAL1),..., (P.VAL59) ) AS T(VAL)<br>  WHERE V.VAL = P.VID AND T.VAL IS NOT NULL ),<br>TEMP_2_3 AS (—Incoming adjacent vertexes in ISA<br>  SELECT COALESCE( S.VAL, P.VAL ) AS VAL<br>  FROM TEMP_2_2 P<br>  LEFT OUTER JOIN ISA 5<br>  ON P.VAL = S.VALID ),<br>TEMP_2_4 AS (—Bi-directional adjacent vertexes<br>  SELECT VAL<br>  FROM TEMP_2_1<br>  UNION ALL<br>  SELECT VAL<br>  FROM TEMP_2_3 ), |
| Duplicate Filter | TEMP_3 AS (—De-duplicate<br>  SELECT DISTINCT VAL AS VAL<br>  FROM TEMP_2_4 AS T) |
| count( ) | SELECT COUNT(*)<br>FROM TEMP_3 | embodiments, the templates include one or more of user defined functions, common table expressions, and stored procedures. Next, as shown at block 708, the method 700 includes assembling the SQL fragments into a single SQL query. In exemplary embodiments, the assembly includes ordering the SQL fragments to optimize the single SQL query. Next, as shown at block 710, the method 700 includes transmitting the single SQL query to the relational database for processing.

Figure 7:
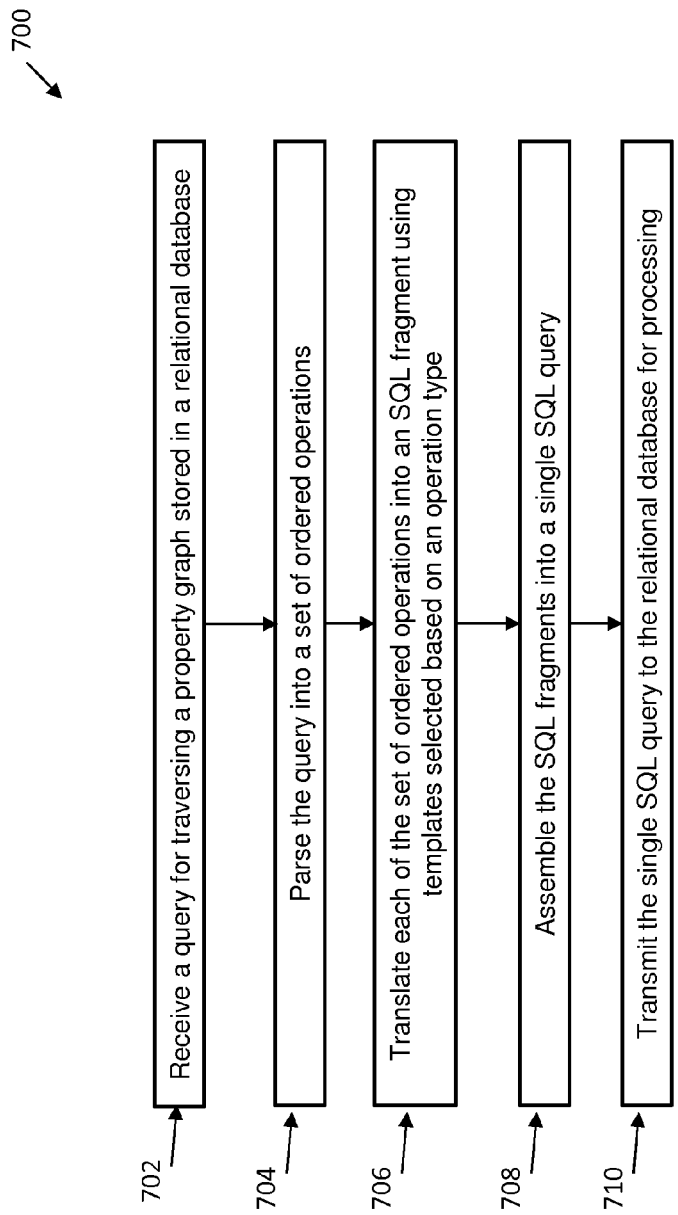
FIG. 7 is a flow diagram of a method of querying graph data stored in a relational database in accordance with an exemplary embodiment.

In exemplary embodiments, a Gremlin query rewrite optimization technique includes replacing a sequence non-selective pipes g.V (retrieve all vertices in g) or g.E (retrieve all edges in g) followed by a sequence of attribute based filter pipes (i.e., filter pipes that select only vertices or edges having specific edge labels, attribute names, or attribute name/value pairs) with a single GraphQuery pipe that combines the non-selective pipes g.V or g.E with the potentially Referring now to FIG. 7, a flow diagram of a method 700 for querying graph data stored in a relational database in accordance with an exemplary embodiment is shown. As shown at block 702, the method 700 includes receiving a query for traversing a property graph stored in a relational database. In exemplary embodiments, the query received is a Gremlin query. Next, as shown at block 704, the method 700 includes parsing the query into a set of ordered operations, also referred to herein as pipes. The method 700 also includes translating each of the set of ordered operations into an SQL fragment using templates selected based on an operation type, as shown at block 706. In exemplary more selective filter pipes. A similar rewrite can be done to replace a sequence of potentially non-selective pipes out, outE, in, or inE followed by a sequence of attribute based filter pipes by a single VertexQuery pipe. Such a VertexQuery rewrite is particularly efficient for the processing of supernodes (i.e., vertices with large number connections to other vertices). In exemplary embodiments, GraphQuery and VertexQuery rewrites allow for a more efficient retrieval of only relevant data by the underlying graph database (e.g., by leveraging indexes on particular attributes). Such merging can be exploited during the translation of the pipes. In exemplary embodiments, the underlying relational database management system is relied on to provide the best evaluation strategy for the generated SQL query.

Basic graph update operations, including addition, update, and deletion of vertices and edges are implemented by a set of stored procedures. Accordingly, graph data can be stored into multiple tables, and some of these operations involve updates to multiple tables. Furthermore, some update operations, such as the deletion of a single supernode of the graph, can result in changes involving multiple rows in multiple tables, which can significantly degrade performance. In exemplary embodiment, vertex deletions are performed by setting the ID of the vertices and edges to be deleted to a negative value corresponding to its current ID. To delete a vertex with ID=i, the VID is set to -i-1 in the vertex attribute and hash adjacency tables, so the relations of deleted rows are maintained across tables and corresponding rows in the edge attribute tables are deleted. Accordingly, the additional condition VID≥0 is added to each query to ensure that vertices marked for deletion are never returned as answers to a query. In exemplary embodiments, an off-line cleanup process can perform the actual removal of the marked vertices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for storing graph data for a directed graph in a relational database, the computer program product comprising:
  a non-transitory storage medium readable by a processing circuit and storing instructions for execution by the processing circuit for performing a method comprising:
  creating a plurality of relational tables for the graph data, wherein the graph data comprises a plurality of vertexes and a plurality of edges, wherein the plurality of relational tables include adjacency tables and attribute tables wherein:
    each row of the attribute tables is dedicated to a subject of the graph data in the dataset and stores a JavaScript Object Notation (JSON) object corresponding to the subject; and
    each row of the adjacency tables comprises a hashtable comprising properties and values of the subject for that row, wherein the hashtable further comprises an index value corresponding to a value shared by a plurality of edges originating from at least one vertex in the plurality of vertexes, wherein the index value further corresponds to a secondary adjacency table comprising edge data for edges originating from the at least one vertex in the plurality of vertexes;
  wherein the adjacency tables include:
    an incoming adjacency table, wherein each row of the incoming adjacency table is dedicated to one of the plurality of vertexes of the graph data and stores data regarding edges that terminate at that vertex; and
    an outgoing adjacency table, wherein each row of the outgoing adjacency table is dedicated to one of the plurality of the vertexes of the graph data and stores data regarding edges that originate at that vertex;
  receiving a query for traversing the graph data stored in the relational database;
  parsing the query into a set of ordered operations;
  translating each of the set of ordered operations into a fragment using a template selected based on an operation type, wherein the template comprises at least one of a common table expression fragment and a stored procedure;
  assembling the fragments into a single query; and
  transmitting the single query to the relational database for processing.

2. The computer program product of claim 1, wherein the attribute tables includes a vertex attribute table, wherein each row of the vertex attribute table is dedicated to one of a plurality of vertexes of the graph data and stores a JavaScript Object Notation (JSON) object corresponding to that vertex.

3. The computer program product of claim 1, wherein the attribute tables includes an edge attribute table, wherein each row of the edge attribute table is dedicated to one of the plurality of edges of the directed graph and stores a JavaScript Object Notation (JSON) object corresponding to that edge.

4. A processing system for storing graph data for a directed graph in a relational database, the system comprising a processor configured to:
  create a plurality of relational tables for the graph data, wherein the graph data comprises a plurality of vertexes and a plurality of edges, wherein the plurality of relational tables include adjacency tables and attribute tables wherein:
    each row of the attribute tables is dedicated to a subject of the graph data in the dataset and stores a JavaScript Object Notation (JSON) object corresponding to the subject; and
    each row of the adjacency tables comprises a hashtable comprising properties and values of the subject for that row, wherein the hashtables further comprises an index value corresponding to a value shared by a plurality of edges originating from at least one vertex in the plurality of vertexes, wherein the index value further corresponds to a secondary adjacency table comprising edge data for edges originating from the at least one vertex in the plurality of vertexes;
  wherein the adjacency tables include:
    an incoming adjacency table, wherein each row of the incoming adjacency table is dedicated to one of the plurality of vertexes of the graph data and stores data regarding edges that terminate at that vertex; and
    an outgoing adjacency table, wherein each row of the outgoing adjacency table is dedicated to one of a plurality of the vertexes of the graph data at stores data regarding edges that originate at that vertex;
  receiving a query for traversing the graph data stored in the relational database;
  parsing the query into a set of ordered operations;
  translating each of the set of ordered operations into a fragment using a template selected based on an operation type, wherein the template comprises at least one of a common table expression fragment and a stored procedure;
  assembling the fragments into a single query; and
  transmitting the single query to the relational database for processing.

5. The processing system of claim 4, wherein the attribute tables includes a vertex attribute table, wherein each row of the vertex attribute table is dedicated to one of a plurality of vertexes of the graph data and stores a JavaScript Object Notation (JSON) object corresponding to that vertex.

6. The processing system of claim 4, wherein the attribute tables includes an edge attribute table, wherein each row of the edge attribute table is dedicated to one of the plurality of edges of the directed graph and stores a JavaScript Object Notation (JSON) object corresponding to that edge.

* * * * *